(12) United States Patent
Gouda et al.

(10) Patent No.: US 7,381,146 B2
(45) Date of Patent: Jun. 3, 2008

(54) HYBRID VEHICLE AND METHOD OF CONTROLLING THE VEHICLE

(75) Inventors: Hideaki Gouda, Ageo (JP); Mitsuhiro Nishina, Ageo (JP); Yuji Suzuki, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 307 days.

(21) Appl. No.: 10/566,442

(22) PCT Filed: Aug. 12, 2003

(86) PCT No.: PCT/JP03/10249

§ 371 (c)(1), (2), (4) Date: Jan. 31, 2006

(87) PCT Pub. No.: WO2005/014322

PCT Pub. Date: Feb. 17, 2005

(65) Prior Publication Data

US 2006/0199696 A1   Sep. 7, 2006

(51) Int. Cl.
*B60W 20/00* (2006.01)

(52) U.S. Cl. .......................................... 477/3; 903/942

(58) Field of Classification Search ................ 903/941
See application file for complete search history.

(56) References Cited

U.S. PATENT DOCUMENTS 5,722,911 A * 3/1998 Ibaraki et al. ................. 477/3

| | | | |
|---|---|---|---|
| 6,492,741 | B1 | 12/2002 | Morimoto et al. |
| 6,526,931 | B1 | 3/2003 | Vilou |
| 6,532,926 | B1 | 3/2003 | Kuroda et al. |

FOREIGN PATENT DOCUMENTS

| | | |
|---|---|---|
| GB | 2371632 | 7/2002 |
| JP | 7-236203 | 9/1995 |
| JP | 8-317505 | 11/1996 |
| JP | 2002-138876 | 5/2002 |
| JP | 2002-221064 | 8/2002 |
| JP | 2003-235110 | 8/2003 |

* cited by examiner

*Primary Examiner*—Sherry Estremsky
*Assistant Examiner*—Edwin A Young
(74) *Attorney, Agent, or Firm*—Rabin & Berdo, PC (57) ABSTRACT

A controller (10) of a hybrid vehicle determines an engine torque at a point on an engine torque high efficiency line at the current engine rotation speed as a target engine torque, and determines the current engine torque from the current engine rotation speed and current accelerator depression amount. Then, when the gear position of a transmission (2) is neutral, the vehicle is stationary and a storage device (9) requires charging, the controller (10) sets the difference between the target engine torque and the current engine torque as a target power generation torque of a motor generator (4), sets a transitional time period corresponding to the target power generation torque, and performs control over the transitional time period to raise the power generation torque of the motor generator gradually to the target power generation torque.

5 Claims, 10 Drawing Sheets

HYBRID VEHICLE AND METHOD OF CONTROLLING THE VEHICLE

TECHNICAL FIELD

This invention relates to a parallel hybrid vehicle comprising an engine and a motor generator as a drive source of the vehicle.

BACKGROUND ART

JP2002-138876A, published by the Japan Patent Office in 2002, discloses a parallel hybrid vehicle comprising an engine and a motor generator as a drive source. In this conventional example, a map for setting an output apportionment ratio of the motor generator and engine in accordance with the SOC of a storage device is stored in a controller. The controller refers to the map to determine the output apportionment ratio in accordance with the SOC of the storage device, and controls the output of the motor generator and the output of the engine on the basis of the determined apportionment ratio and an accelerator depression amount.

DISCLOSURE OF THE INVENTION

In this type of hybrid system, when the vehicle is stationary and the gear position of the transmission is neutral, engine idling stop control may be performed. However, if an engine idling stop is performed without taking the state of charge (SOC) of the storage device into account, opportunities for charging the storage device may be lost, and if the state of charge of the storage device decreases, it may be difficult to start the vehicle using only the output of the motor generator. Further, the maximum output of the motor generator is large at low rotation speeds and decreases as the rotation speed increases, and it is therefore desirable that the output of the motor generator be used to the fullest extent when starting the vehicle.

It is therefore an object of this invention to execute an idling stop appropriately, taking into consideration the state of charge of a storage device, and to enable maximal use of the output of a motor generator during restarting.

This invention provides a hybrid vehicle comprising an engine, a transmission which changes the speed of the rotation of an input shaft and transmits this rotation to an output shaft, a motor generator, a power transmission mechanism which connects a rotary shaft of the motor generator and the input shaft of the transmission, a storage device which is connected to the motor generator, and a controller. The controller sets an engine torque at a point on an engine torque high efficiency line at the current engine rotation speed as a target engine torque, calculates the current engine torque from the current engine rotation speed and current accelerator depression amount, and when the gear position of the transmission is neutral, the vehicle is stationary, and the storage device requires charging, sets the difference between the target engine torque and the current engine torque as a target power generation torque of the motor generator, and controls the motor generator such that the power generation torque of the motor generator matches the target power generation torque.

An embodiment of this invention and advantages of this invention will be described in detail below with reference to the attached drawings.

BEST MODE FOR CARRYING OUT THE INVENTION

Figure 1:
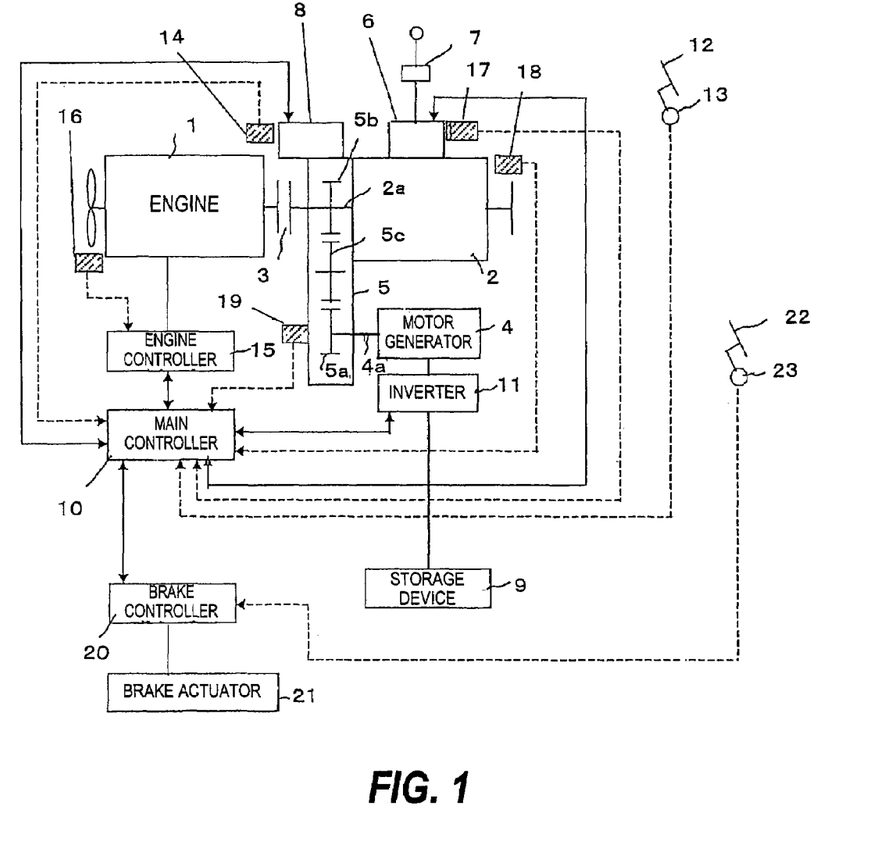
FIG. 1 is a block diagram of a parallel hybrid vehicle according to this invention.

Referring to FIG. 1 of the drawings, a hybrid vehicle comprises an engine 1 and a motor generator 4 serving as a drive source, and a step transmission 2 employing a planetary gear. A friction clutch 3 is interposed between the engine 1 and transmission 2. The engine 1 is a diesel engine or a CNG engine using high-pressure natural gas as a fuel. A rotary shaft 4a of the motor generator 4 is connected to an input shaft 2a of the transmission 2 via a power transmission mechanism 5.

A speed change controller 6 which controls the gear position of the transmission 2 is provided in the transmission 2. The speed change controller 6 is connected to a select lever 7 and a main controller 10. When a driver manipulates the select lever 7, the speed change controller 6 controls the gear position of the transmission 2 to realize the gear position selected by the select lever 7.

The clutch 3 is engaged and disengaged by a clutch actuator 8. The clutch actuator 8 engages or disengages the clutch 3 in accordance with a request from the main controller 10, thereby determining whether or not a driving force is transmitted from the engine 1 to the transmission 2 and power transmission mechanism 5. An engine controller 15 controls a fuel injection amount (fuel supply amount) of the engine 1. The rotation speed of the engine 1 is detected by an engine rotation speed sensor 16. The engine controller 15 controls the fuel injection amount of the engine 1 in accordance with a detection signal from the engine rotation speed sensor 16 and a request from the main controller 10.

A brake actuator 21 which applies a braking force to the wheels is controlled by a brake controller 20 on the basis of information from the main controller 10 (a regenerative braking force of the motor generator 4) and the depression amount of a brake pedal 22 (a requested braking force) to compensate for the part of the requested braking force that cannot be provided fully by the regenerative braking force. The depression amount of the brake pedal 22 is detected by a brake sensor 23.

The motor generator 4 employs a permanent magnet synchronous motor gPM synchronous motor) due to its high efficiency, small size, and light weight. The motor generator 4 is connected to a storage device 9 via an inverter 11. The storage device 9 employs an electric double layer capacitor having a high output density for regenerating braking energy with high efficiency, no waste, and in a short time period.

The inverter 11 controls the motor generator 4 to an electric operation mode or a power generation mode in accordance with a request from the main controller 10. In the electric operation mode, the motor generator 4 is driven by converting the charged energy (direct current power) of the storage device 9 into alternating current power. In the power generation mode, on the other hand, the storage device 9 is charged by converting the generated energy of the motor generator 4 (alternating current power) into direct current power.

The power transmission mechanism 5 is constituted by a drive gear 5a connected to the rotary shaft 4a of the motor generator 4, a driven gear 5b connected to the input shaft 2a of the transmission 2, and an idler gear 5c which meshes with the drive gear 5a and driven gear 5b. The rotation of the rotary shaft 4a of the motor generator 4 is reduced in speed by the power transmission mechanism 5 and transmitted to the input shaft 2a of the transmission 2. Conversely, the rotation of the input shaft 2a of the transmission 2 is increased in speed by the power transmission mechanism 5 and transmitted to the rotary shaft 4a of the motor generator 4.

Detection signals from an accelerator depression amount sensor 13 which detects the depression amount (requested driving force) of an accelerator pedal 12, a clutch sensor 14 which detects the engagement and disengagement of the clutch 3, a gear position sensor 17 which detects the gear position of the transmission 2, a vehicle speed sensor 18 which detects the output side rotation speed of the transmission 2 (i.e. an output rotation speed sensor which detects the output rotation speed of the transmission 2), and a rotation speed sensor 19 which detects the rotation speed of the drive gear 5a, which is connected to the rotary shaft 4a of the motor generator 4, as the input side rotation speed of the transmission 2 (i.e. an input rotation speed sensor which detects the input rotation speed of the transmission 2), are input into the main controller 10.

The main controller 10 controls the clutch actuator 8 and the inverter 11 of the motor generator 4 on the basis of these detection signals, as well as various information (information obtained from the engine controller 15, brake controller 20, speed change controller 6, and inverter 11) including the state of charge (SOC) of the storage device 9. The main controller 10 also outputs requests to the engine controller 15 and brake controller 20, and commands (speed change commands) to the speed change controller 6.

Figure 2:
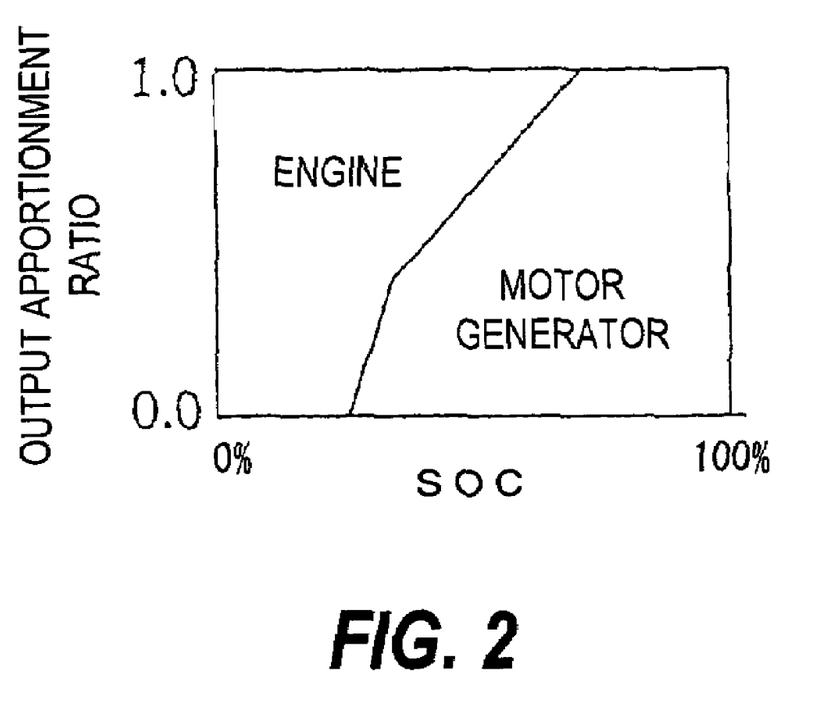
FIG. 2 is a table defining the relationship between a state of charge of a storage device, and an output apportionment ratio between an engine and a motor generator.

FIG. 2 is an output apportionment map which is stored in the main controller 10 and defines the relationship between the SOC of the storage device 9 and the apportionment ratio between the output of the motor generator 4 and the output of the engine 1.

The main controller 10 refers to the output apportionment map to determine the output apportionment ratio corresponding to the SOC of the storage device 9, and controls the output of the motor generator 4 and the output of the engine 1 on the basis of the apportionment ratio and the requested driving force (accelerator depression amount). In other words, the main controller 10 controls the inverter 11 such that the motor generator 4 generates its apportioned output, and outputs a request (a fuel supply amount corresponding to the apportioned output of the engine 1) to the engine controller 15 to have the engine 1 generate its apportioned output.

When the output apportionment ratio of the motor generator 4 is one (and the output apportionment ratio of the engine 1 is zero), the inverter 11 is controlled with the clutch 3 in a state of disengagement such that an output corresponding to the accelerator depression amount is obtained only from the motor generator 4.

When the output apportionment ratio of the motor generator 4 is less than one (and the output apportionment ratio of the engine 1 is greater than zero), the inverter 11 is controlled with the clutch 3 in a state of engagement such that the apportioned output of the motor generator 4 decreases steadily as the SOC of the storage device 9 decreases, and a request is output to the engine controller 15 to increase the apportioned output of the engine 1.

When the output apportionment ratio of the engine 1 is one (and the output apportionment ratio of the motor generator is zero), a request is output to the engine controller 15 requesting that an output corresponding to the accelerator depression amount be obtained only from the engine 1.

The main controller 10 cooperates with the brake controller 20 such that whenever the storage device 9 can be charged, the inverter 11 is controlled with the clutch 3 in a state of disengagement to obtain a regenerative braking force corresponding to the brake depression amount (brake pedal depression amount) from the motor generator 4, thereby charging the storage device 9. Further, when the requested braking force corresponding to the brake depression amount cannot be provided fully by the regenerative braking force of the motor generator 4, a request is output to the brake controller 20 to compensate for this part of the braking force with a braiding force generated by the brake actuator 21. Moreover, when it is determined, on the basis of the SOC of the storage device 9, that charging is required and there is leeway in the output of the engine 1 with the clutch 3 in a state of engagement, the inverter 11 is controlled to charge the storage device 9 using the power generation of the motor generator 4.

Figure 3:
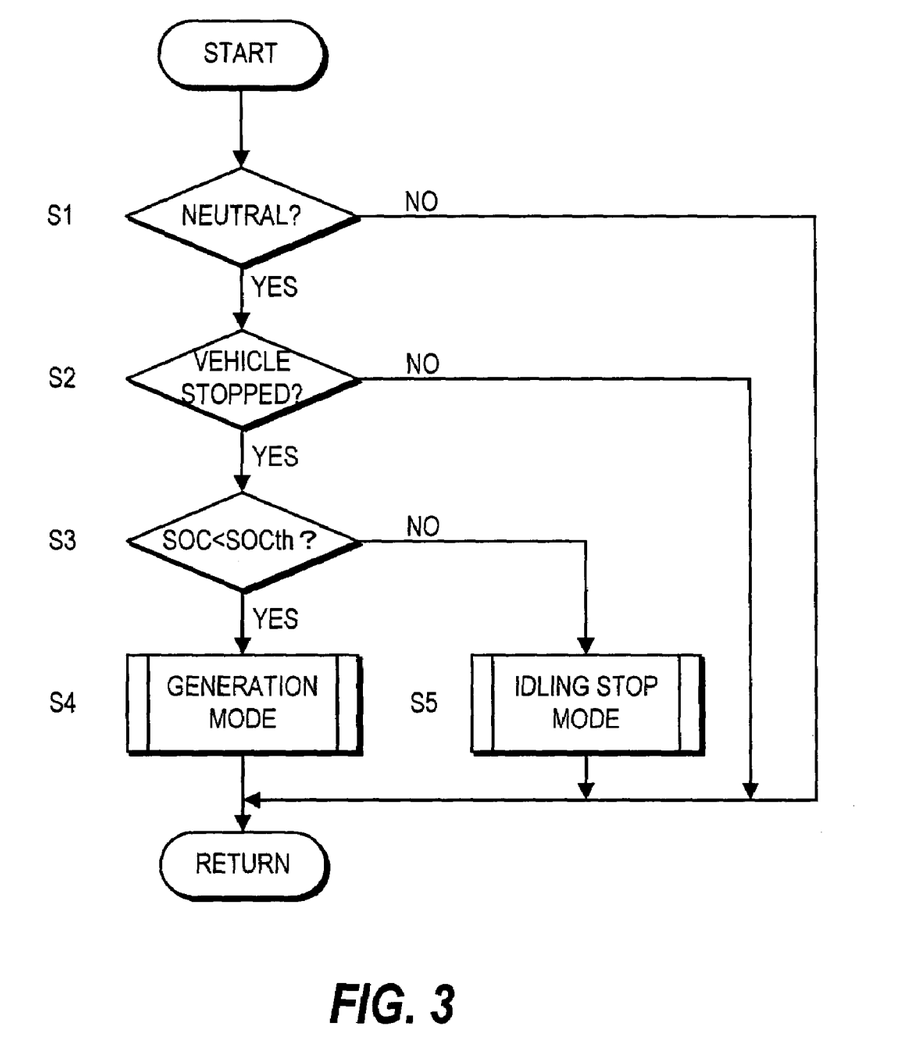
FIG. 3 is a flowchart showing the content of control executed by a main controller.

FIG. 3 is a flowchart illustrating the content of the control executed by the main controller 10 when the vehicle is stationary, which is executed repeatedly in the main controller 10.

In a step S1, the detection signal from the gear position sensor 17 is read to determine whether or not the gear position is neutral. In a step S2, the detection signal from the vehicle speed sensor 18 is read to determine whether or not the vehicle has stopped (whether or not the vehicle speed is zero or extremely low).

When the determination of the step S1 is affirmative and the determination of the step S2 is affirmative, the process advances to a step S3. On the other hand, when at least one of the determinations in the step S1 and the step S2 is negative, the process is terminated.

In the step S3, a determination is made on the basis of the SOC of the storage device 9 as to whether or not the storage device 9 needs to be charged (whether or not the SOC is smaller than a predetermined value SOCth). When the determination of the step S3 is affirmative, the process advances to the power generation mode of a step S4. On the other hand, when the determination of the step S3 is negative, the process advances to an idling stop mode (control to halt operations of the engine 1) of a step S5.

Figure 4:
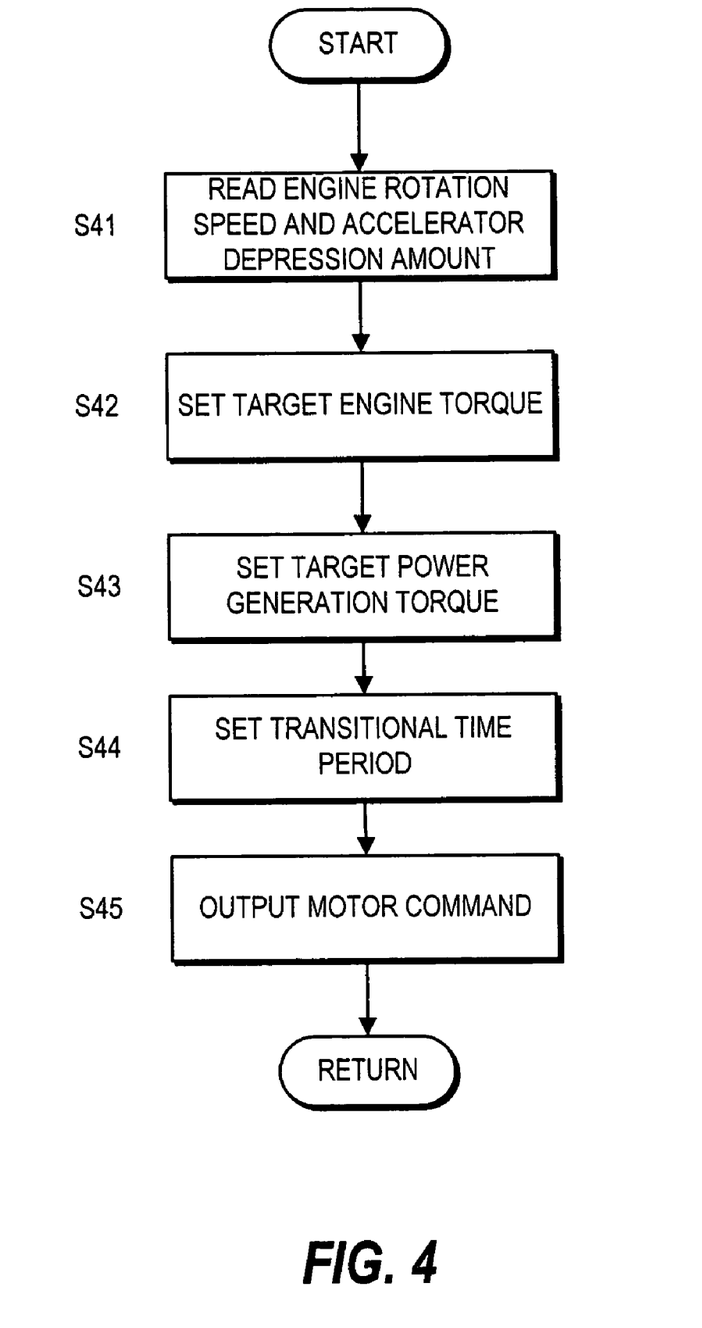
FIG. 4 is a flowchart showing the content of control executed by the main controller in a power generation mode.
Figure 5:
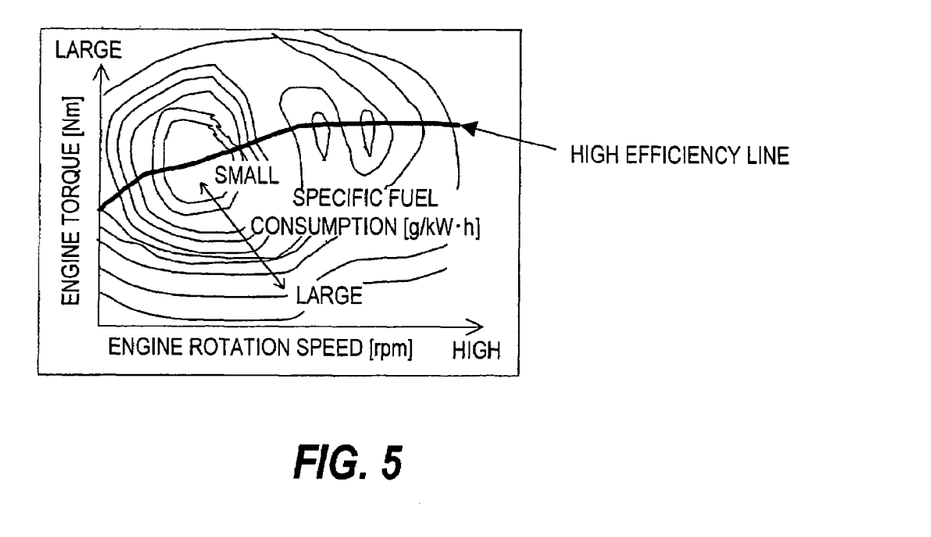
FIG. 5 is a map showing the relationship of a specific fuel consumption to an engine rotation speed and an engine torque.

FIG. 4 is a flowchart illustrating the content of the processing performed in the step S4, and accordingly the content of the control that is executed in the power generation mode. Maps shown in FIGS. 5-7 are stored in the main controller 10.

In a step S41, the detection signal from the engine rotation speed sensor 16 and the detection signal from the accelerator depression amount sensor 13 are read. In a step S42, on the basis of the map shown in FIG. 5, an engine torque at a point on an engine torque high efficiency line at the current engine rotation speed is set as a target engine torque.

Figure 6A:
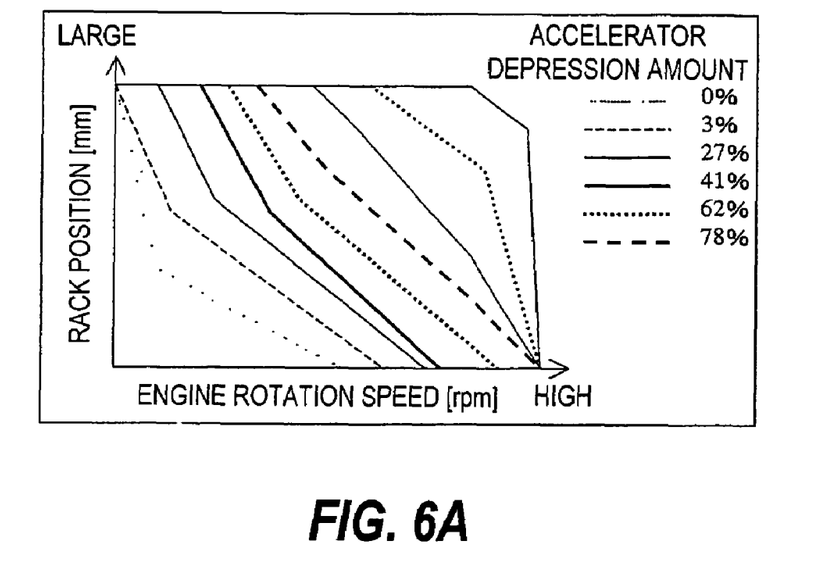
FIG. 6A is a map defining the relationship of a rack position (fuel injection amount) to the engine rotation speed and an accelerator depression amount.
Figure 6B:
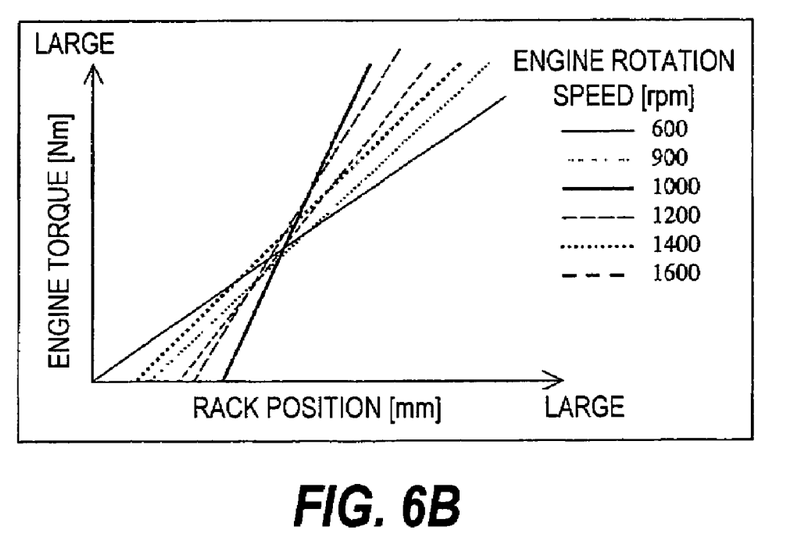
FIG. 6B is a map defining the relationship of the engine torque to the rack position (fuel injection amount) and the engine rotation speed.

In a step S43, a rack position (fuel injection amount) is determined from the engine rotation speed and accelerator depression amount by referring to the map shown in FIG. 6A. Further, the current engine torque (at the point in time when the engine rotation speed and accelerator depression amount are read in the step S41) is determined from the rack position and engine rotation speed by referring to the map shown in FIG. 6B, and a value obtained by subtracting the current engine torque from the target engine torque is set as a target power generation torque of the motor generator 4.

Figure 7:
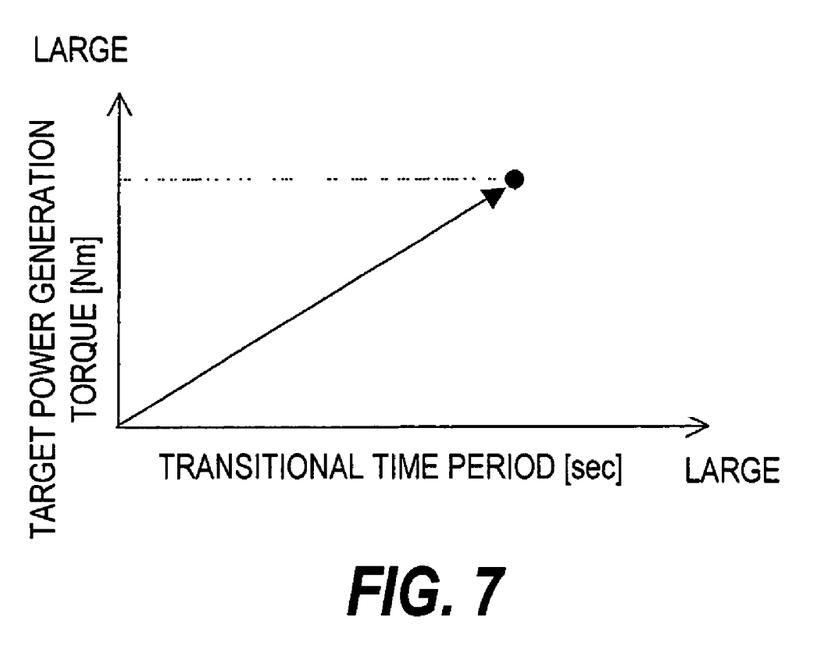
FIG. 7 is a table defining the relationship between a target power generation torque and a transitional time period.

In a step S44, a transitional time period corresponding to the target power generation torque is set by referring to the map shown in FIG. 7.

In a step S45, the power generation torque of the motor generator 4 is raised gradually to the target power generation torque over the transitional time period set in the step S44. Once the transitional time period has elapsed and the power generation torque has reached the target power generation torque, a command is issued to the inverter 11 to maintain the target power generation torque for as long as the conditions of the power generation mode remain established, or in other words until at least one of the determinations in the steps S1-S3 becomes negative. It should be noted that once the target power generation torque has been set, the steps S41-S44 are not executed until at least one of the determinations in the steps S1-S3 becomes negative.

By means of the constitution described above, when the vehicle is stationary (when the gear position of the transmission 2 is neutral and the vehicle speed is zero or extremely low) and the SOC of the storage device 9 is small, therefore requiring charging, an idling stop is not executed, and instead the power generation torque of the motor generator 4 is controlled to the target power generation torque. The storage device 9 is charged by the power generation of the motor generator 4, and hence the state of charge of the storage device 9 increases, enabling an increase in the number of opportunities for starting the vehicle using only the output of the motor generator 4 when the vehicle is restarted. The engine 1 is controlled such that the fuel injection amount is increased in accordance with the load (power generation torque) from the motor generator 4, and such that the engine torque is raised while maintaining the engine rotation speed at a constant level. The target engine torque is set such that the operating point of the engine 1 is on the engine torque high efficiency line, and therefore favorable fuel economy and exhaust performance can also be secured.

Figure 9:
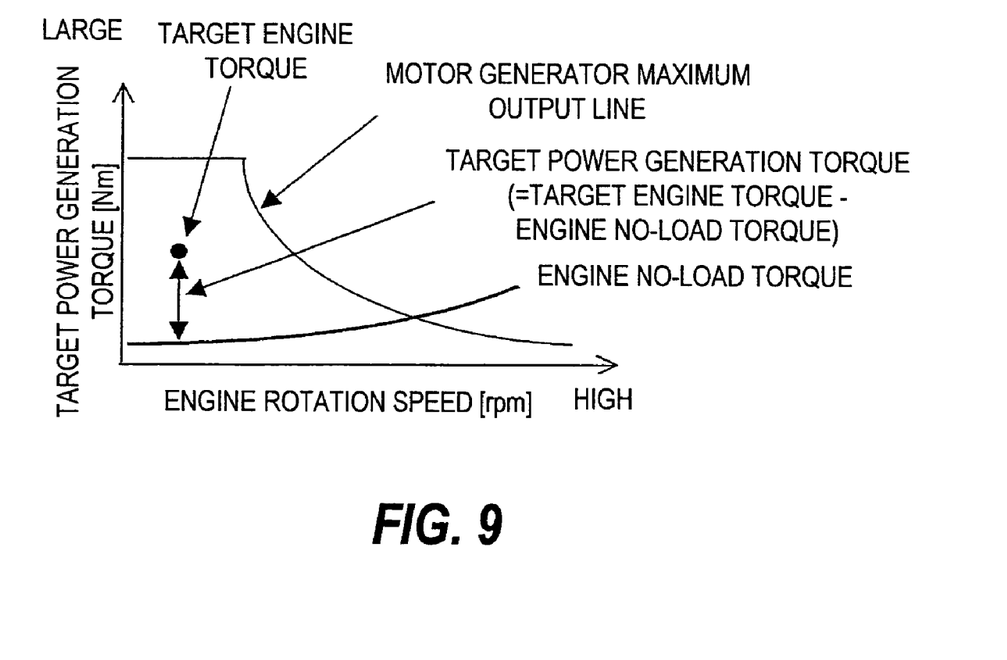
FIG. 9 is a view illustrating the content of the control executed in the power generation mode.

FIG. 9 is a view illustrating the content of the control executed in the power generation mode. The power generation torque of the motor generator 4 is controlled to a target motor torque, which is a value obtained by subtracting an engine no-load torque (the torque required to rotate the engine itself) from the target engine torque.

Figure 8:
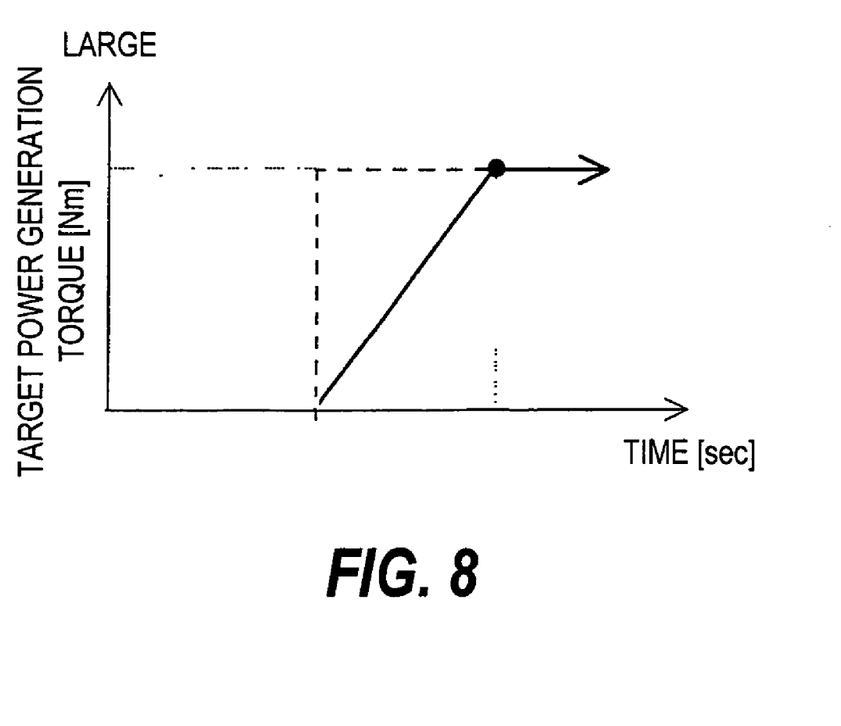
FIG. 8 is a time chart showing the manner in which the target power generation torque changes.

The power generation torque of the motor generator 4 is not raised momentarily in a single step to the target power generation torque, as shown by the dotted line in FIG. 8, but instead is raised gradually over the predetermined transitional time period, as shown by the solid line in FIG. 8. As a result, the load of the engine 1 (the power generation torque) varies gently so that disturbances in the engine rotation speed are avoided, and hence power generation can be performed with stability and without worsening the exhaust performance.

On the other hand, when the vehicle is stationary and the state of charge of the storage device 9 is high such that charging of the storage device 9 is not needed, an idling stop is executed to halt operations of the engine 1, and therefore a reduction in fuel consumption produced by the engine idling stop can be obtained. Since the SOC of the storage device 9 is sufficient, the vehicle can be started using the output of the motor generator 4 alone when restarting the vehicle, and hence there is no reduction in the number of opportunities for starting the vehicle using the output of the motor generator 4 alone.

It should be noted that in the embodiment described above, the control system is constituted by a plurality of controllers, but the number of controllers may be increased or decreased, and the control system may be constituted by a single controller.

INDUSTRIAL APPLICABILITY

This invention may be applied to a parallel hybrid vehicle comprising an engine and a motor generator as a drive source, and is useful for improving starting performance, fuel economy, and exhaust performance.

The invention claimed is:

1. A hybrid vehicle comprising an engine (1), a transmission (2) which changes a speed of a rotation of an input shaft and transmits the rotation to an output shaft, a motor generator (4), a power transmission mechanism (5) which connects a rotary shaft of the motor generator (4) and the input shaft of the transmission (2), a storage device (9) which is connected to the motor generator (4), and a controller (10), characterized in that the controller (10) sets an engine torque at a point on an engine torque high efficiency line at a current engine rotation speed as a target engine torque, calculates a current engine torque from the current engine rotation speed and a current accelerator depression amount, and when a gear position of the transmission (2) is neutral, the vehicle is stationary, and the storage device (9) requires charging, sets a difference between the target engine torque and the current engine torque as a target power generation torque of the motor generator (4), and controls the motor generator (4) such that a power generation torque of the motor generator (4) matches the target power generation torque.

2. The hybrid vehicle as defined in claim 1, characterized in that the controller (10) sets a transitional time period corresponding to the target power generation torque, and controls the motor generator (4) over the transitional time period to raise the power generation torque to the target powergeneration torque.

3. The hybrid vehicle as defined in 2, characterized in that the controller (10) halts an operation of the engine (1) when the gear position of the transmission (4) is neutral, the vehicle is stationary, and the storage device (9) does not require charging.

4. The hybrid vehicle as defined in claim 1, characterized in that the controller (10) halts an operation of the engine (1) when the gear position of the transmission (4) is neutral, the vehicle is stationary, and the storage device (9) does not require charging.

5. A control method for a hybrid vehicle comprising an engine (1), a transmission (2) which changes a speed of a rotation of an input shaft and transmits the rotation to an output shaft, a motor generator (4), a power transmission mechanism (5) which connects a rotary shaft of the motor generator (4) and the input shaft of the transmission (2), and a storage device (9) which is connected to the motor generator (4), characterized in that the control method comprises:

setting an engine torque at a point on an engine torque high efficiency line at a current engine rotation speed as a target engine torque, calculating a current engine torque from the current engine rotation speed and a current accelerator depression amount, and when a gear position of the transmission (2) is neutral, the vehicle is stationary, and the storage device (9) requires charging, setting a difference between the target engine torque and the current engine torque as a target power generation torque of the motor generator (4), and controlling the motor generator (4) such that a power generation torque of the motor generator (4) matches the target power generation torque.

\* \* \* \* \*